United States Patent
Zhang et al.

(10) Patent No.: US 10,458,352 B2
(45) Date of Patent: Oct. 29, 2019

(54) CONTROL SYSTEM FOR ENGINE

(71) Applicant: Caterpillar Inc., Peoria, IL (US)

(72) Inventors: Yanchai Zhang, Dunlap, IL (US);
Perry Dwain Converse, Lafayette, IN (US); Michael Andrew Snopko, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 218 days.

(21) Appl. No.: 15/708,673

(22) Filed: Sep. 19, 2017

(65) Prior Publication Data

US 2019/0085781 A1 Mar. 21, 2019

(51) Int. Cl.
*F02D 41/14* (2006.01)
*F02D 41/22* (2006.01)
*F02D 41/24* (2006.01)
*F02D 41/00* (2006.01)

(52) U.S. Cl.
CPC ..... *F02D 41/1401* (2013.01); *F02D 41/1497* (2013.01); *F02D 41/22* (2013.01); *F02D 41/2451* (2013.01); *F02D 41/0097* (2013.01); *F02D 2041/1433* (2013.01); *F02D 2041/228* (2013.01); *F02D 2200/0625* (2013.01)

(58) Field of Classification Search
CPC ............. F02D 41/1401; F02D 41/1402; F02D 2041/1433; F02D 41/22; F02D 41/1497; F02D 41/2451
See application file for complete search history.

(56) References Cited

U.S. PATENT DOCUMENTS

| | | | |
|---|---|---|---|
| 6,148,808 A | 11/2000 | Kainz | |
| 6,601,442 B1 | 8/2003 | Decker et al. | |
| 6,705,294 B2 | 3/2004 | Shinogle | |
| 7,020,595 B1 | 3/2006 | Adibhatla et al. | |
| 9,759,132 B2 * | 9/2017 | Khalid | B64C 11/305 |
| 2016/0369762 A1 | 12/2016 | Hakeem et al. | |

* cited by examiner

*Primary Examiner* — Jacob M Amick (57) ABSTRACT

A control system for an engine includes an operational data sensor generating signals indicative of operational data of the engine and a controller communicably coupled with the engine and the operational data sensor. The controller operates the engine based on operational parameters defined by a baseline engine model. The controller receives the signals indicative of the operational data of the engine, and generates a dynamic engine model which defines at least one operational parameter of the engine based on the received operational data of the engine. The controller compares the baseline engine model to the dynamic engine model. The controller determines a difference between the baseline engine model and the dynamic engine model based on the comparison. The controller compares the determined difference to a threshold difference value and operates the engine based on the dynamic engine model, if the determined difference exceeds the threshold difference value.

20 Claims, 3 Drawing Sheets

CONTROL SYSTEM FOR ENGINE

TECHNICAL FIELD

The present disclosure relates to a control system for an engine. More specifically, the present disclosure relates to methods and systems for controlling an operational state of the engine.

BACKGROUND

Internal combustion engines have many components that can affect the reliable and efficient operation of the engine. Engine operation and performance may be especially affected by the condition of those components that are associated with the engine's combustion cylinders such as intake and exhaust valves, piston rings, head gaskets and/or the like. Failures can occur for various reasons, such as thermal cycling, fatigue and/or the like. When such components fail, or their performance is compromised by a less than complete failure, the effects of such failure (partial or complete) may not be immediately apparent to an operator of the engine. However, such failures may cause a reduction in engine power, loss of sufficient sealing of the engine's combustion cylinder, increased oil consumption, decreased fuel economy, and/or other effects.

Even in the absence of a component-related condition, internal combustion engine may be further affected by various environmental factors such as ambient air temperature, barometric pressure, fuel quality, engine core temperature, and/or other factors. Such environmental factors, in addition to or instead of engine component conditions, may result in issues with engine combustion including misfire, engine knocking (i.e., detonation of the fuel/air mixture), and/or pre-ignition. Aside from adversely affecting engine fuel consumption, noise, roughness, emissions, and power output, improper combustion can also result in premature engine component failure, engine starting issues, and others.

The calibration of a control system for engines is a very laborious and extensive process for automakers, or automobile manufacturers, or engine manufacturers. A baseline map may be developed for regular usage of the engine. However, as the engine experiences certain changes due to regular wear and part replacements, the changes may result in altered performance over time. With physical changes in the engine, re-calibration of the baseline map for controlling the engine may be required to maintain efficient operating conditions as the baseline map may not be appropriately calibrated due to various changes in the operating conditions of the engine.

U.S. Pat. No. 6,705,294 (hereinafter referred to as "'294 reference") describes a system and method of adjusting an application of a fuel injecting limiting map to compensate for fuel injection variability. The method of the '294 reference includes estimating a performance difference between at least one fuel injector and a like number of nominal fuel injectors, and adjusting the application of one or more various fuel limiting maps if the performance difference exceeds a pre-determined value.

SUMMARY

In an aspect of the present disclosure, a control system for an engine is provided. The control system includes an operational data sensor configured to generate signals indicative of operational data of the engine. The control system includes a controller communicably coupled with the engine and the operational data sensor. The controller operates the engine based on a baseline engine model. The baseline engine model defines at least one operational parameter based on which the engine operates. The controller receives the signals indicative of the operational data of the engine. The controller generates a dynamic engine model of the engine based on the received operational data. The dynamic engine model defines at least one operational parameter based on which the engine operates. The controller compares the baseline engine model to the dynamic engine model. The controller determines a difference between the at least one operational parameter defined by the baseline engine model and the at least one operational parameter defined by the dynamic engine model. The difference is determined based on the comparison between the baseline engine model and the dynamic engine model. The controller compares the determined difference to a threshold difference value, and operates the engine based on the at least one operational parameter defined by the dynamic engine model, if the determined difference exceeds the threshold difference value.

In another aspect of the present disclosure, a method of controlling an engine is provided. The method includes operating the engine based on a baseline engine model by a controller. The baseline engine model defines at least one operational parameter based on which the engine operates. The method includes receiving signals indicative of operational data of the engine by the controller. The method includes generating a dynamic engine model based on the operational data of the engine by the controller. The dynamic engine model defines at least one operational parameter based on which the engine operates. The method includes comparing the baseline engine model to the dynamic engine model by the controller. The method includes determining a difference between the at least one operational parameter defined by the baseline engine model and the at least one operational parameter defined by the dynamic engine model based on the comparison by the controller. The method includes comparing the determined difference to a threshold difference value by the controller. The difference is determined based on the comparison between the baseline engine model and the dynamic engine model. The method further includes operating the engine based on the at least one operational parameter defined by the dynamic engine model by the controller, if the determined difference exceeds the threshold difference value.

In yet another aspect of the present disclosure, a controller which can be retrofitted to an engine is disclosed. The controller receives signals indicative of a first operational data of the engine. The controller generates a baseline engine model of the engine based on the first operational data. The baseline engine model defines at least one operational parameter based on which the engine operates. The controller operates the engine based on the at least one operational parameter defined by the baseline engine model. The controller receives signals indicative of a second operational data of the engine. The controller generates a dynamic engine model based on the second operational data. The dynamic engine model defines at least one operational parameter based on which the engine operates. The controller compares the at least one operational parameter defined by the baseline engine model to the at least one operational parameter defined by the dynamic engine model. The controller determines a difference between the at least one operational parameter defined by the baseline engine model and the at least one operational parameter defined by the dynamic engine model. The difference is determined based on comparing the baseline engine model to the dynamic engine model. The controller compares the determined difference to a threshold difference value. The controller then operates the engine based on the at least one operational parameter defined by the dynamic engine model, if the determined difference exceeds the threshold difference value.

DETAILED DESCRIPTION

Figure 1:
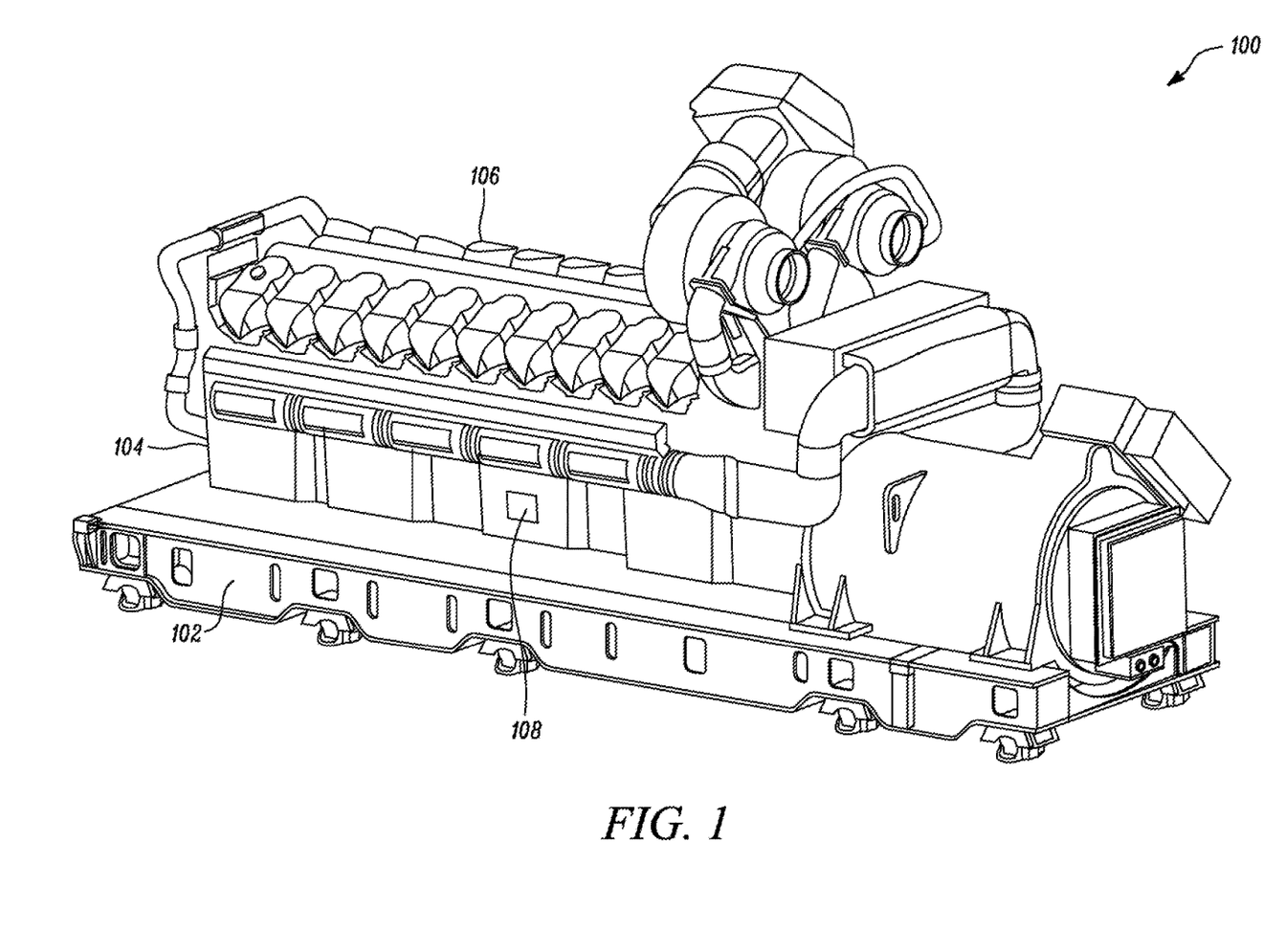
FIG. 1 is a perspective view of an engine, in accordance with an embodiment of the present disclosure.

Wherever possible, the same reference numbers will be used throughout the drawings to refer to same or like parts. FIG. 1 shows an exemplary internal combustion engine 100. The engine 100 may be used, for example, for construction industries, for petroleum industries, for power generation industries, or for shipping industries etc. While the following detailed description describes an exemplary aspect generally, it should be appreciated that the description applies equally to the use of the engine 100 of the present disclosure in any other industry as well.

The engine 100 includes a base 102 supporting an engine body 104. In some embodiments, the base 102 may be omitted and the engine body 104 may be directly mounted to a chassis or frame of a respective platform or a machine. The engine body 104 may include a plurality of cylinders 106 operating to generate power. The plurality of cylinders 104 may be arranged in an in-line orientation, an angular orientation, or in any other suitable orientation. The engine 100 further includes an operational data sensor 108 for measuring operational data of the engine 100.

Operational data of the engine 100 may include values of one or more operational parameters. The values of the operational parameters constituting the operational data may be collected over a period of time and/or collected at a particular date and/or time. The operational parameter may include any appropriate parameter provided by a controller 202 (shown in FIG. 2) to the engine 100 to control various aspects of engine operation. For example, the operational parameter may include an engine load, an engine speed, an air density of ambient air, a target power generation of the engine 100, a target fuel economy of the engine 100 a type of fuel on which the engine 100 is operating, an ambient air temperature, a compression ratio of the engine 100, an injection timing of the engine 100, and/or an amount of fuel to be injected in every combustion cycle of the engine 100. It should be noted that examples of the operational parameters of the engine 100 listed here are not limiting and may include other operational parameters as well without affecting the scope of the present disclosure.

The operational data sensor 108 is configured to generate signals indicative of the operational data of the engine 100. Although, the operational data sensor 108 is shown to be attached at a specific position to the engine body 104 in the illustrated embodiment, one or more operational data sensors 108 may he positioned anywhere or at multiple places for generating a signal indicative of the operational data of the engine 100.

In some embodiments, the engine 100 may be operating on diesel, gas, or any other suitable fuel. Although not specifically shown in the present embodiment, the engine 100 may be coupled with any suitable transmission for transferring power to any tool (not shown). In some embodiments, the engine 100 may be a turbocharged, supercharged, or any other such suitably charged engine. In some embodiments, the engine 100 may include a physically changed engine having replaced parts and sensors and not operating efficiently on a baseline engine model. In some embodiments, the baseline engine model may be used to define one or more operational parameters of the engine 100 for operating the engine 100.

Figure 2:
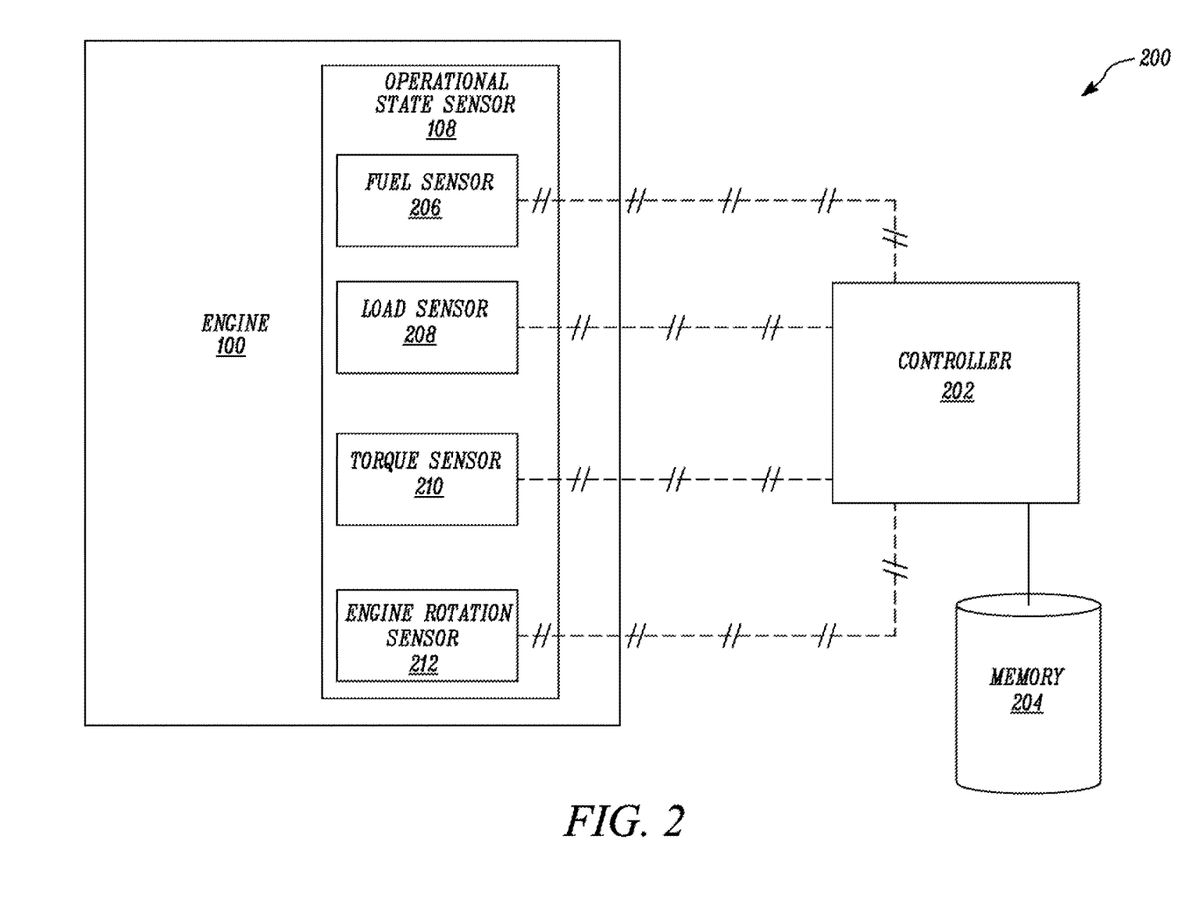
FIG. 2 is a schematic representation of a control system of the engine, in accordance with an embodiment of the present disclosure.

Now referring to FIG. 2, a control system 200 is illustrated. The control system 200 includes the operational data sensor 108, and the controller 202 communicably coupled with the engine 100 and the operational data sensor 108. In some embodiments, the operational data sensor 108 may include one or more sensors. In some embodiments, the controller 202 may be a retrofitted controller. In some embodiments, the controller 202 is associated with a memory 204. For example, the memory 204 may be integrated with the controller 202 or may be located remotely and may be accessed over a network (e.g., over a cellular network, a local area network, Internet, and/or other communication networks).

In some embodiments, the operational data sensor 108 may include a fuel sensor 206. The fuel sensor 206 may determine the real-time fuel consumption of the engine 100 and a deviation in fuel consumption due to usage over time. Additionally, or alternatively, the operational data sensor 108 may include a load sensor 208. The load sensor 208 may calculate a real-time load on the engine 100, including any transient loads put on the engine 100 during operation.

Additionally, or alternatively, the operational data sensor 108 may include a torque sensor 210 coupled to the engine 100. The torque sensor 210 may calculate the torque being generated by the engine 100. Additionally, or alternatively, the operational data sensor 108 may include an engine rotation sensor 212. The engine rotation sensor 212 may calculate the engine speed of the engine 100. In some embodiments, the operational data sensor 108 may be a combination of the above sensors for detecting the operational data of the engine 100.

Additionally, or alternatively, the operational data sensor 108 may include a fuel-injection timing sensor for calculating a real-time injection timing for plurality of fuel injectors (not shown) and generating the signal indicative of the injection timing. The replacements of the fuel injectors due to wear may affect the real-time injection timing, and thereby the operation of the engine 100 according to the baseline engine model. In some embodiments, the operational data sensor 108 may include a temperature sensor for calculating a real-time temperature from plurality of temperature sensors (not shown) and generating the signal indicative of the engine temperature. The replacements of various temperature sensors due to wear and an error in older sensors due to general wear and tear may affect the real-time temperature of the engine 100, and thereby the operation of the engine 100 according to the baseline engine model.

The control system 200 further includes the controller 202 communicably coupled with the engine 100 and the operational data sensor 108. When the engine 100 is operated initially, the baseline engine model may be stored in the memory 204 of the controller 202, and the engine 100 may be operated based on the baseline engine model.

In some embodiments, when the controller 202 is retrofitted on to the engine 100, initially there is no baseline engine model stored in the memory 204 accessible to the controller 202 for operating the engine 100. The retrofitted controller 202 receives signals indicative of a first operational data of the engine 100. In some embodiments, the first operational data may include the operational data collected when the controller 202 is retrofitted to the engine 100, or over a period of time after the controller 202 is retrofitted to the engine 100.

The term "retrofit" is used in this specification and the claims to refer to providing an engine already in use with the controller 202. Typically, the controller 202 may be provided with an engine at the time of manufacturing/assembly. However, retrofitting is done on an engine which is already in use (after the time of manufacturing/assembly) for a particular application. The controller 202 may be a single controller or multiple controllers working together to perform a variety of tasks. The controller 202 may embody a single or multiple microprocessors, field programmable gate arrays (FPGAs), digital signal processors (DSPs), etc., that include a means for controlling the operating state of the engine 100. Various functions of the controller 202 and respective applications are described the forthcoming disclosure.

With combined reference to FIGS. 1 and 2, the operational data sensor 108 provides operational data to the controller 202. The controller 202 operates the engine 100 based on the baseline engine model created for the engine 100 and stored in the memory 204 accessible to the controller 202.

In some embodiments, the baseline engine model comprises one or more of a fuel economy graph, an engine load graph, an engine output power graph, and/or an engine output torque graph. It must be noted that various types of graphs are listed for illustration purposes only and is non-limiting in the context of the present disclosure. In some embodiments, the various type of graph may be stored in the memory 204 when the controller 202 is provided with the engine 100 at the time of manufacturing/assembly. The various types of graphs may be generated based on the operational data collected at the time of retrofitting of the controller 202 with the engine 100 to generate the baseline engine model. The graphs may also be provided according to some particular performance criteria required by a customer, or any requirements for the application in which the engine 100 is being used (such as a mining application, a construction application, and/or the like).

The fuel economy graph may include information identifying a fuel consumed by the engine 100 with respect to the total power produced by the engine 100, or fuel consumption with respect to time, fuel consumption with respect to engine cycles and/or the like. In this context, the engine cycle refers to a cycle of events starting from fuel and/or air being supplied to the engine 100, the fuel and/or air being compressed, combustion of fuel and air, and removal of exhaust gases from combustion chamber of the engine 100. Fuel consumption with respect to engine cycles refers to changes in quantity of fuel being consumed over subsequent engine cycles. The engine load graph may include information identifying load on the engine 100 during multiple cycles of operation against the fuel consumed, against the injection timing, and/or the like. In some embodiments, the load on the engine 100 may include both constant and transient loads on the engine 100. The engine output power graph may include information identifying output power of the engine 100 projected against fuel consumed, or power demand projected against fuel consumed or time spent for producing the power projected against fuel consumed. The engine output torque graph may include information identifying torque produced by the engine 100 projected against time, torque produced by the engine 100 projected against engine load and/or the like.

It must be noted that the various graphs may vary depending on multiple factors, for example the type of application for which the engine 100 is being used, the type of fuel being used by the engine 100, amount and periodicity of transient loads on the engine 100, average power demand over a fixed number of cycles, and/or the like. For example, when the engine 100 is being used for an application requiring higher values for the torque, or high values for the output power of the engine 100 produced by the engine 100, the graphs may include the engine output torque graph or the engine output power graph, respectively. An exemplary case may be a digging operation of an excavator requires substantially more torque and output power from an engine as compared to an empty bucket swing operation of an excavator. Thus, the baseline engine model may accordingly include an engine output torque graph which provides higher output torque for digging operation as compared to empty bucket swing operation. Additionally, or alternatively, the baseline engine model may include fuel economy as the operational parameter to operate the engine 100. Additionally, or alternatively, an applicable load on the engine 100 during a period of time may be the operational parameter for the baseline engine model to operate the engine 100.

Additionally, or alternatively, the controller 202 may utilize a control of fuel-injection timing as the operational parameter for controlling, the engine 100. In some embodiments, the baseline engine model may be provided with data related to the change in dimensions and/or parts of the engine 100 over time. For example, a spark plug typically wears with time such that a gap between two electrodes increases. The gap between the two electrodes may be measured by any conventional means, and the baseline engine model may be updated with the new dimensions of the spark plug. It should be noted that the spark plug is only provided as an exemplary component, and the present disclosure is not limited by any such components of the engine 100 in any manner.

Operating the engine 100 based on the baseline engine model refers to analyzing the one or more graphs by the controller 202, and determining the operational parameters from the graphs by the controller 202. Afterwards, the controller 202 operates the engine 100 based on these determined parameters. For example, the baseline engine model may include a fuel economy graph defining fuel economy for a desired operation of the engine 100. The controller 202 may analyze the fuel economy graph, and then determine the engine speed and the engine load from the fuel economy graph. Then, the controller 202 may use the determined engine load and engine speed values to operate the engine 100 such that the engine 100 operates at the determined engine speed, and the engine load remains at or below the determined engine load to enable the engine 100 to operate in accordance with (or follow) the fuel economy graph defined by the baseline engine model. It should be noted that the baseline engine model is not limited to any type of graph, and may include any appropriate graph based on the application for which the engine 100 is being used. Also, the examples of the operational parameters provided do not limit the present disclosure in any manner.

The controller 202 further generates a dynamic engine model based on the operational data provided by the operational data sensor 108. In the context of the present disclosure, the operational data for the dynamic engine model may include various operational parameters defined and used for generating the baseline engine model. However, the operational parameters for the baseline engine model and the operational parameters for the dynamic engine model are collected at different instances. When the controller 202 is provided with the engine 100 at the time of manufacturing/assembly, the operational parameters constituting the operational data for the baseline engine model are collected when the engine 100 starts initial operation. The operational parameters constituting the operational data for the dynamic engine model are collected after some particular amount of time following the initial operation of the engine 100.

When the controller 202 is retrofitted with the engine 100, the operational parameters constituting the operational data for the baseline engine model are measured when the engine 100 starts initial operation with the retrofitted controller 202. The operational parameters constituting the operational data for the dynamic engine model are measured after lapse of some particular amount of time following the initial operation of the engine 100 with the retrofitted controller 202.

It must be noted that both the baseline engine model and the dynamic engine model may be used to operate only one engine (e.g., engine 100, as shown in the present embodiment) or multiple engines which may be similar to each other, or different from each other in terms of capacity, operational parameters, control, and/or the like in various embodiments of the present disclosure, in some embodiments, the capacity may include a capacity of the engine 100 (e.g., a cubic capacity, a volume, and/or the like), a power generating capacity of the engine 100, a torque generating capacity of the engine 100, and/or the like. In some embodiments, the difference in control of the multiple engines may include controlling the engines based on different operational parameters.

The controller 202 compares the baseline engine model to the dynamic engine model. In the context of the present disclosure, comparison between the baseline engine model and the dynamic engine model may refer to comparing values of the operational parameters defined by the baseline engine model and the dynamic engine model respectively. The controller 202 determines a difference between the baseline engine model and the dynamic engine model based on the above comparison. In some embodiments, the difference may include a difference between the operational parameters defined by the baseline engine model and the operational parameters defined by the dynamic engine model.

In some embodiments, the determined difference from the above comparison may be compared with a threshold difference value. The threshold difference value, in some embodiments of the present disclosure, may include a pre-determined threshold difference value stored in the memory 204 accessible by the controller 202. In some embodiments, the threshold difference value determined by the controller 202 may be based upon the operational parameters of the engine 100 defined by the baseline engine model.

In some embodiments, the controller 202 operates the engine 100 based on the dynamic engine model if the determined difference exceeds the threshold difference value. For example, if the determined difference between the engine revolutions per minute (rpm) of the baseline engine model and the engine rpm of the dynamic engine model detected by the operational data sensor 108 exceeds the threshold difference value, the controller 202 operates the engine 100 by changing the engine rpm value defined by the baseline engine model to the engine rpm value defined by the dynamic engine model. Similar examples may be noted for other operational parameters of the engine 100 (e.g., fuel injection timing, spark advance time, engine load, and/or the like). Alternatively, the controller 202 operates the engine 100 based on the operational parameters defined by the baseline engine model if the determined difference does not exceed the threshold difference value.

For example, if the determined difference between the engine rpm of the baseline engine model and the real-time engine rpm detected by the operational data sensor 108 does not exceed the threshold difference value, the controller 202 continues to operate the engine 100 based on the engine rpm as defined in the baseline engine model. In some embodiments, the determined difference may be equal to the threshold difference value, and the controller 202 may operate the engine 100 based on the operational parameters defined by the baseline engine model. In some embodiments, the controller 202 may operate the engine 100 based on the operational parameter defined by the dynamic engine model even when the determined difference may be equal to the threshold difference value based on historical values/deviations of the determined difference. In some embodiments, the controller 202 is further configured to calculate a difference between the determined difference and the threshold difference value and generate a diagnostic event if the calculated difference exceeds a threshold value. For example, if the determined difference between the engine rpm of the baseline engine model and the engine rpm of the dynamic engine model exceeds the threshold value, the controller 202 may generate a notification informing operators.

In some embodiments, the controller 202 may provide an option to the operators to choose if the operator wants to replace the baseline engine model with the dynamic engine model, before a transition of the engine model takes place between the engine rpm of the baseline engine model and the engine rpm of the dynamic engine model. The controller 202 may provide the option in order to provide a manual override option for the present disclosure.

In some embodiments, the threshold difference value may be pre-determined and stored in the memory 204 accessible to the controller 202, or the threshold difference value may be dynamically calculated and periodically updated by the controller 202. In some embodiments, the dynamic calculation and/or the periodic update of the threshold difference value may be done by the controller 202 in a similar manner as described above for the generation of the dynamic engine model by the controller 202. For example, in case the operational parameter is the engine rpm, the threshold difference value will be difference between the engine rpm value as defined by the baseline engine model and the engine rpm value as defined by the dynamic engine model. The threshold difference value may be defined based upon different characteristics of the engine (such as type of the engine 100, cubic capacity of the engine 100, or any other such characteristic properly of the engine 100), and then updated based on an application in which the engine 100 is being used. The application may include a power generation application, a mining application, a marine application and/or the like. In some embodiments, the threshold difference value may be dynamically adjusted based on the operational data related to any particular part of the engine 100 and based on the service and replacement history of the part. For example, the threshold difference value for the engine rpm may be dynamically adjusted based on the operational data related to piston rings and a replacement history of the piston rings, as any issues (e.g., defect) in the piston rings may affect the engine rpm. In some embodiments, the diagnostic event may include generating a request for replacement of or for a physical re-calibration of the part associated with the diagnostic event. In some embodiments, generating the alert for the operator includes at least one of a text notification, a visual notification, and/or an audio alert.

In some embodiments, the controller 202 determines whether the dynamic engine model is fully generated and ready to replace the baseline engine model. For example, the controller 202 may determine whether the dynamic engine model includes the engine rpm data collected over the period of time. In another example, the controller 202 may determine whether the dynamic engine model includes the injection timing data collected based on the desired application of the engine 100. The controller 202 operates the engine 100 based on the dynamic engine model if the dynamic engine model is ready to replace the baseline engine model. Alternatively, the controller 202 continues to operate the engine 100 based on the baseline engine model if the dynamic engine model is not ready to replace the baseline engine model.

INDUSTRIAL APPLICABILITY

The present disclosure provides a method of controlling the engine 100. A method 300 for controlling the engine 100 such that the engine 100 is operated efficiently on the operational parameters defined by an updated engine model based on current operating conditions at all times is illustrated with the help of FIG. 3. In some embodiments, the engine 100 is switched on and is operating to generate power.

Figure 3:
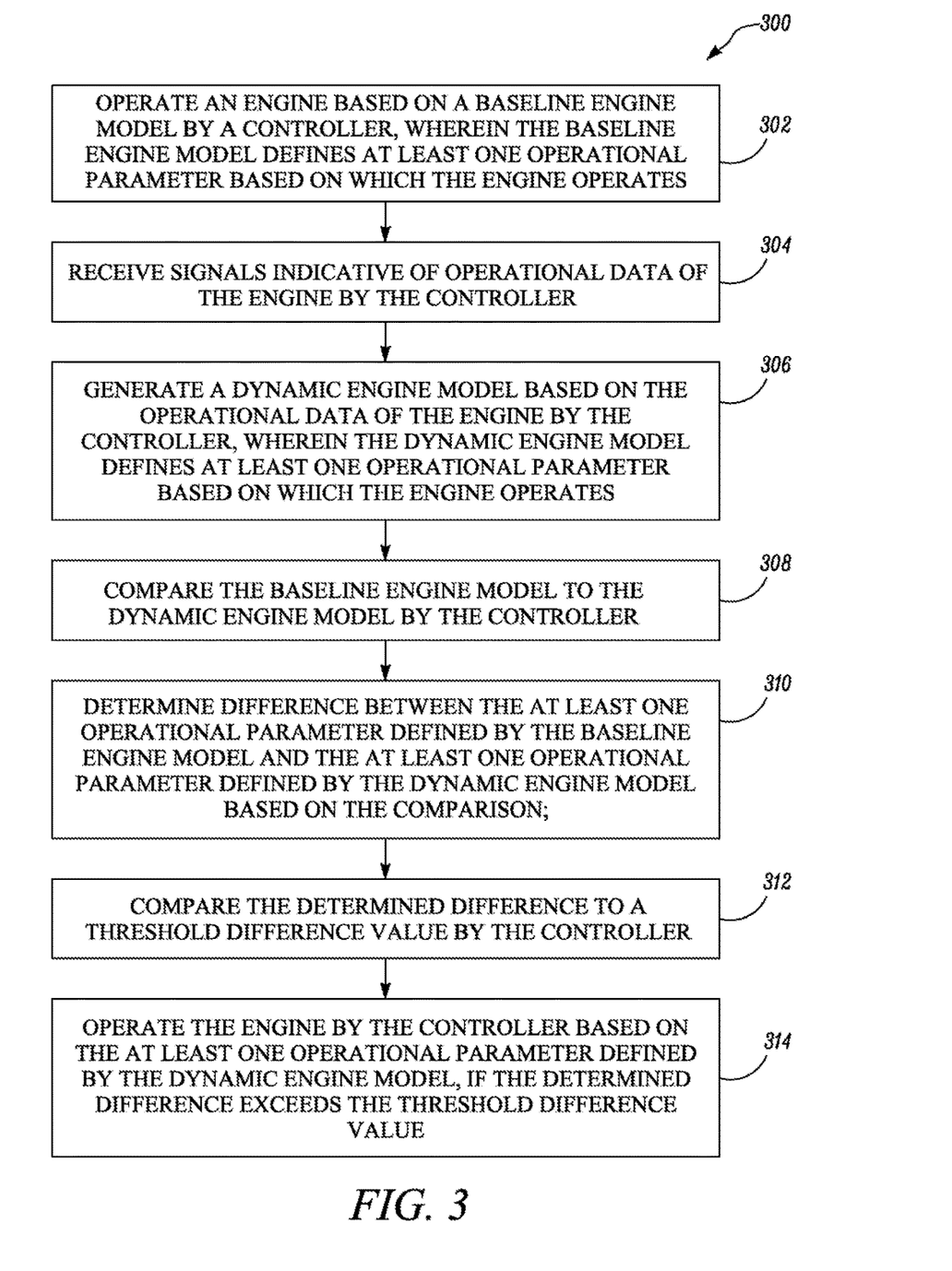
FIG. 3 is a flow chart depicting a method of controlling the engine in accordance with an embodiment of the present disclosure.

The method 300 at step 302 includes operating the engine 100 by the controller 202 based on the operational parameters defined by the baseline engine model. In some embodiments, the operational parameters may include an engine rpm, an air density of ambient air, a target power generation, a target fuel economy, a type of fuel on which the engine 100 is operating, an ambient air temperature, a compression ratio of the engine 100, an injection timing, and/or an amount of fuel to be injected in every combustion cycle of the engine 100. It must be noted that examples of the operational parameters of the engine 100 listed here are not limiting and may include additional or fewer operational parameters without affecting the scope of the present disclosure.

The method 300 at step 304 includes receiving the signals indicative of the operational data of the engine 100 by the controller 202. The operational data may include variables such as exhaust quality, fuel composition, output power etc. The method 300 at step 306 includes generating the dynamic engine model based on the received operational data of the engine 100 by the controller 202. The dynamic engine model is generated based on the operational parameters of the engine 100. The operational parameters are determined based on the operational data measured by the operational data sensor 108, and thus the engine 100 is operated more efficiently.

The method 300 at step 308 includes comparing, by the controller 202, the baseline engine model and the dynamic engine model. In this context, comparing the baseline engine model and the dynamic engine model refers to comparing the operational parameters as defined by the baseline engine model and the operational parameters defined by the dynamic engine model. For example, if the operating parameter is engine speed, the comparison refers to comparing the engine speed, as defined by the baseline engine model, and the engine speed as defined by the dynamic engine model. The method 300 at step 310 includes determining, by the controller 202, the difference between the baseline engine model and the dynamic engine model based on the comparison. In the context of the present disclosure, determining the difference between the baseline engine model and the dynamic engine model refers to determining an offset or a difference between one or more values of one or more operational parameters as defined by the baseline engine model and one or more values of corresponding one or more operational parameters as defined by the dynamic engine model.

The method 300 at step 312 includes comparing by the controller 202, the determined difference with the threshold difference value. The method 300 at step 314 includes operating by the controller 202, the engine 100 based on the operational parameters defined by the dynamic engine model if the determined difference exceeds the threshold difference value. The generation of the dynamic engine model obviates any need for manual simulation for operating the engine 100, eliminating the problem related to change in configurations of the engine 100. Further, operating the engine 100 based on the operating parameters defined by most recently updated engine model, that is operating on the dynamic engine model instead of the baseline engine model, makes the engine 100 perform better and efficiently with the change in operating conditions.

The method 300 may further comprise calculating a difference between the determined difference and the threshold difference value by the controller 202. The method 300 may comprise generating the diagnostic event by the controller 202 if the calculated difference exceeds a threshold value. In some embodiments, generating the alert for the operator includes least one of a text notification, a visual notification, and an audio alert, in some embodiments, the controller 202 may store the baseline engine model and the dynamic engine model. The baseline engine model and the dynamic engine model may include fuel economy graph, engine load graph, engine output power graph, and/or the engine output torque graph for determining and comparing values of various operational parameters of the engine 100. Furthermore, the diagnostic event may include a request for immediate service or overhaul of the engine 100. Additionally, or alternatively, as part of the diagnostic event, the controller 202 may stop the operation of the engine 100 immediately, or after lapse of a pre-determined time after the raising of the request for immediate service or overhaul of the engine 100.

While aspects of the present disclosure have been particularly shown and described with reference to the embodiments above, it will be understood by those skilled in the art that various additional embodiments may be noted by the modification of the disclosed machines, systems and methods without departing from the spirit and scope of what is disclosed. Such embodiments should be understood to fall within the scope of the present disclosure as determined, based upon the claims and any equivalents thereof.

No element/component, act/action performed by any element/component, or instruction used herein should be construed as critical or essential unless explicitly described as such. Additionally, the phrase "based on" is intended to mean "based, at least in part, on" unless explicitly stated otherwise. Furthermore, the articles "a" and "an," as used herein, are intended to include one or more items, and may be used interchangeably with "one or more." In the event only one item is intended, the term "one" or similar language is used. Moreover, the terms "has," "have," "having," or the like, as also used herein, are intended to be open-ended terms.

What is claimed is:

1. A control system for an engine, the control system comprising:
    an operational data sensor configured to generate signals indicative of operational data of the engine; and
    a controller communicably coupled with the engine and the operational data sensor, the controller configured to:
        operate the engine based on a baseline engine model, wherein the baseline engine model defines at least one operational parameter based on which the engine operates;
        receive the signals indicative of the operational data of the engine;
        generate a dynamic engine model of the engine based on the received operational data, wherein the dynamic engine model defines at least one operational parameter based on which the engine operates;
        compare the baseline engine model to the dynamic engine model;
        determine a difference between the at least one operational parameter defined by the baseline engine model and the at least one operational parameter defined by the dynamic engine model, wherein the difference is determined based on comparing the baseline engine model to the dynamic engine model;
        compare the determined difference to a threshold difference value; and
        operate the engine based on the at least one operational parameter defined by the dynamic engine model, if the determined difference exceeds the threshold difference value.

2. The control system of claim 1, wherein the controller is further configured to:
    continue to operate the engine based on the at least one operational parameter defined by the baseline engine model, if the determined difference does not exceed the threshold difference value.

3. The control system of claim 1, wherein the controller is further configured to:
    determine whether to replace the dynamic engine model with the baseline engine model.

4. The control system of claim 3, wherein the operational data includes values of one or more operational parameters.

5. The control system of claim 3, herein the controller is further configured to:
    operate the engine based on the at least one operational parameter defined by the baseline engine model, when the dynamic engine model is not to replace the baseline engine model.

6. The control system of claim 1, wherein the controller is further configured to:
    calculate a difference between the determined difference and the threshold difference value; and
    generate a diagnostic event, if the calculated difference exceeds a threshold value.

7. The control system of claim 6, wherein generating the diagnostic event includes generating an alert for the operator,
    the alert including at least one of a text notification, a visual notification, or an audio alert.

8. The control system of claim 1, wherein:
    operating the engine based on the baseline engine model comprises setting a value of the at least one operational parameter as defined by the baseline engine model; and
    operating the engine based on the dynamic engine model comprises setting a value of the at least one operational parameter as defined by the dynamic engine model.

9. A method of controlling an engine, the method comprising:
    operating the engine, by a controller, based on a baseline engine model, wherein the baseline engine model defines at least one operational parameter based on which the engine operates;
    receiving, by the controller, signals indicative of operational data of the engine;
    generating, by the controller, a dynamic engine model based on the operational data of the engine, wherein the dynamic engine model defines at least one operational parameter based, on which the engine operates;
    comparing, by the controller, the baseline engine model to the dynamic engine model;
    determining, by the controller, a difference between the at least one operational parameter defined by the baseline engine model and the at least one operational parameter defined by the dynamic engine model based on the comparison;
    comparing, by the controller, the determined difference to a threshold difference value; and
    operating, by the controller, the engine based on the at least one operational parameter defined by the dynamic engine model, if the determined difference exceeds the threshold difference value.

10. The method of claim 9, further including:
    operating, by the controller, the engine based on the at least one operational parameter defined by the baseline engine model, if the determined difference does not exceed the threshold difference value.

11. The method of claim 9, further comprising:
    determine, by the controller, whether to replace the dynamic engine model with the baseline engine model.

12. The method of claim 11, further comprising:
    continue operating, by the controller, the engine based on at least one operational parameter defined by the dynamic engine model, when the dynamic engine model is to replace the baseline engine model.

13. The method of claim 11, wherein the operational data includes values of one or more operational parameters.

14. The method of claim 9, further comprising:
    calculating, by the controller, a difference between the determined difference and the threshold difference value; and
    generating, by the controller, a diagnostic event, if the calculated difference exceeds a threshold value.

15. The method of claim 14, wherein generating the diagnostic event includes generating an alert for an operator such that the alert includes at least one of a text notification, a visual notification, or an audio alert.

16. The method of claim 9, wherein:
    operating the engine based on the baseline engine model comprises setting a value of the at least one operational parameter as defined by the baseline engine model; and
    operating the engine based on the dynamic engine model comprises setting a value of the at least one operational parameter as defined by the dynamic engine model.

17. A controller configured to be retrofitted to an engine, the controller configured to:
    receive signals indicative of a first operational data of the engine;
    generate a baseline engine model of the engine based on the first operational data, wherein the baseline engine model defines at least one operational parameter based on which the engine operates;

operate the engine based on the at least one operational parameter defined by the baseline engine model;

receive signals indicative of a second operational data of the engine;

generate a dynamic engine model based on the second operational data, wherein the dynamic engine model defines at least one operational parameter based on which the engine operates;

compare the at least one operational parameter defined by the baseline engine model to the at least one operational parameter defined by the dynamic engine model;

determine a difference between the at least one operational parameter defined by the baseline engine model and the at least one operational parameter defined by the dynamic engine model, wherein the difference is determined based on comparing the baseline engine model to the dynamic engine model;

compare the determined difference to a threshold difference value; and operate the engine based on the at least one operational parameter defined by the dynamic engine model, if the determined difference exceeds the threshold difference value.

18. The controller of claim 17, wherein the controller is further configured to:

continue operating the engine based on the at least one operational parameter defined by the baseline engine model, if the determined difference does not exceed the threshold difference value.

19. The controller of claim 17, wherein the controller is further configured to:

determine whether the dynamic engine model is to replace the baseline engine model.

20. The controller of claim 17, wherein the controller is further configured to:

calculate a difference between the determined difference and the threshold difference value; and generate a diagnostic event, if the calculated difference exceeds a threshold difference value, wherein the diagnostic event is generated in form of at least one of a text notification, a visual notification, or an audio alert.

* * * * *